(12) United States Patent
Cook

(10) Patent No.: US 6,722,489 B1
(45) Date of Patent: Apr. 20, 2004

(54) SCREW CONVEYOR ARM FOR DRY MATERIAL

(75) Inventor: Anthony J. Cook, Florence, SC (US)

(73) Assignee: Aluminum Ladder Company, Florence, SC (US)

( * ) Notice: Subject to any disclaimer, the term of this patent is extended or adjusted under 35 U.S.C. 154(b) by 0 days.

(21) Appl. No.: 10/368,124

(22) Filed: Feb. 18, 2003

(51) Int. Cl.$^7$ ............................................. B65G 29/00
(52) U.S. Cl. ....................... 198/608; 198/601; 198/657; 414/326; 414/325
(58) Field of Search ................................ 414/326, 325, 414/323, 328; 198/657, 608, 601

(56) References Cited

U.S. PATENT DOCUMENTS

| | | | | |
|---|---|---|---|---|
| 4,220,434 A | * | 9/1980 | Letzig | 414/326 |
| 4,428,182 A | | 1/1984 | Allen et al. | 56/146 |
| 4,455,111 A | * | 6/1984 | Jackson et al. | 406/56 |
| 4,669,945 A | | 6/1987 | Pollard | 414/505 |
| 4,781,513 A | | 11/1988 | Sjogren et al. | 414/489 |
| 5,078,261 A | * | 1/1992 | Miller et al. | 198/601 |
| 5,318,444 A | * | 6/1994 | Kuzub et al. | 414/326 |
| 5,348,435 A | * | 9/1994 | Bissex | 414/310 |
| 6,068,108 A | * | 5/2000 | Dudley | 198/671 |
| 6,296,106 B1 | | 10/2001 | Marchesini | 198/608 |
| 6,330,767 B1 | | 12/2001 | Carr et al. | 52/192 |

* cited by examiner

Primary Examiner—Christopher P. Ellis
Assistant Examiner—Rashmi Sharma
(74) Attorney, Agent, or Firm—Charles L. Schwab; Nexsen Pruet LLC

(57) ABSTRACT

A dry bulk unloading apparatus for transferring bulk material from a storage facility to a transport vehicle includes a pair of pivotally interconnected upper and lower screw conveyors. The upper screw conveyor is pivotally connected at its receiving end on a vertical axis to the storage facility and is pivotally connected at its discharge end on a vertical axis to the receiving end of a lower screw conveyor. The conveyors each have an auger driven by an electric motor and electric motors are provided to pivot the upper screw conveyor relative to the storage facility and to pivot the lower screw conveyor relative to the upper screw conveyor. A hand held controller may be used for remote control of the electric motors.

9 Claims, 2 Drawing Sheets

SCREW CONVEYOR ARM FOR DRY MATERIAL

TECHNICAL FIELD

This invention relates to apparatus for transferring dry bulk material from a storage facility to a mobile transport vehicle such as a truck or railway car.

BACKGROUND OF THE INVENTION

The use of screw conveyors for moving loose bulk material is well known. For instance U.S. Pat. No. 6,296,106 issued Oct. 2, 2001 to V. Marchesini for a Screw Conveyor For Loose Material discloses an upright screw conveyor having a pivotable lower housing part rigidly cross connected to a housing of a transversely positioned screw conveyor. Thus the lower screw conveyor is pivotable about the axis of the upright screw conveyor.

U.S. Pat. No. 4,781,513 issued Nov. 1, 1988 to L. ajogren et al for Apparatus For Unloading Bulk Material discloses a first hydraulic motor driven screw conveyor pivotally connected at one of its ends to the rear of a dump truck bed so that is can be swung to either side of the truck by a hydraulic motor. The free end of the first conveyor discharges into a hooper of a second screw conveyor driven by a hydraulic motor. The second screw conveyor is pivotally connected on an upright axis to the first screw conveyor. The disclosed conveyor system is particularly adapted for unloading asphalt material and spreading the material in the unloading process.

BRIEF SUMMARY OF THE INVENTION

When unloading dry bulk material from a stationary storage facility, the unloading apparatus, such as a chute, must be aligned with the receiving opening of the truck or railway car to which the material is transferred. It is often necessary to adjust the position of the railway car or truck in order to obtain proper alignment or registration. The before mentioned registration procedure typically requires the presence of two or more people and is time consuming. This invention provides a positionable screw conveyor arm which does not require precise positioning of the vehicle receiving the bulk material.

It is an object of this invention to provide a screw conveyor arm for unloading bulk material from an elevated storage facility to a transport vehicle, such as a truck or railway car, which can be positioned and operated by a single person.

It is a further object of the invention to provide a screw conveyor arm for unloading bulk material which does not require precise positioning of the vehicle receiving the bulk material. Another object of the invention is to provide a bulk unloading control system by which a single person controls the position of the screw conveyor apparatus for proper discharge alignment with the receiving vehicle and also controls the discharge of the bulk material.

A bulk material unloading apparatus is provided which includes an upper horizontally disposed screw conveyor having its receiving end pivotally connected on a vertical axis to a discharge structure of a storage facility and a lower horizontally disposed screw conveyor which has its receiving end pivotally connected to the underside of the discharge end of the upper screw conveyor. Bulk material is discharged into a transport vehicle through a discharge chute on the discharge end of the lower screw conveyor after the person controlling the unloading operation positions the discharge chute over the material receiving opening of the transport vehicle. Reversible electric motors power gearing to rotate the first screw conveyor relative to the storage facility and the lower screw conveyor relative to the first screw conveyor. The auger of each screw conveyor is driven by a separate electric motor. The electric motors are controlled by the unloading person through use of a hand held controller which permits the unloading person to move to a position in which he can observe the registration of the conveyor discharge chute with the bulk material receiving opening of the transport vehicle.

BRIEF DESCRIPTION OF THE DRAWINGS

One embodiment of the invention is illustrated in the accompanying drawings, in which.

DETAILED DESCRIPTION OF THE INVENTION

Figure 1:
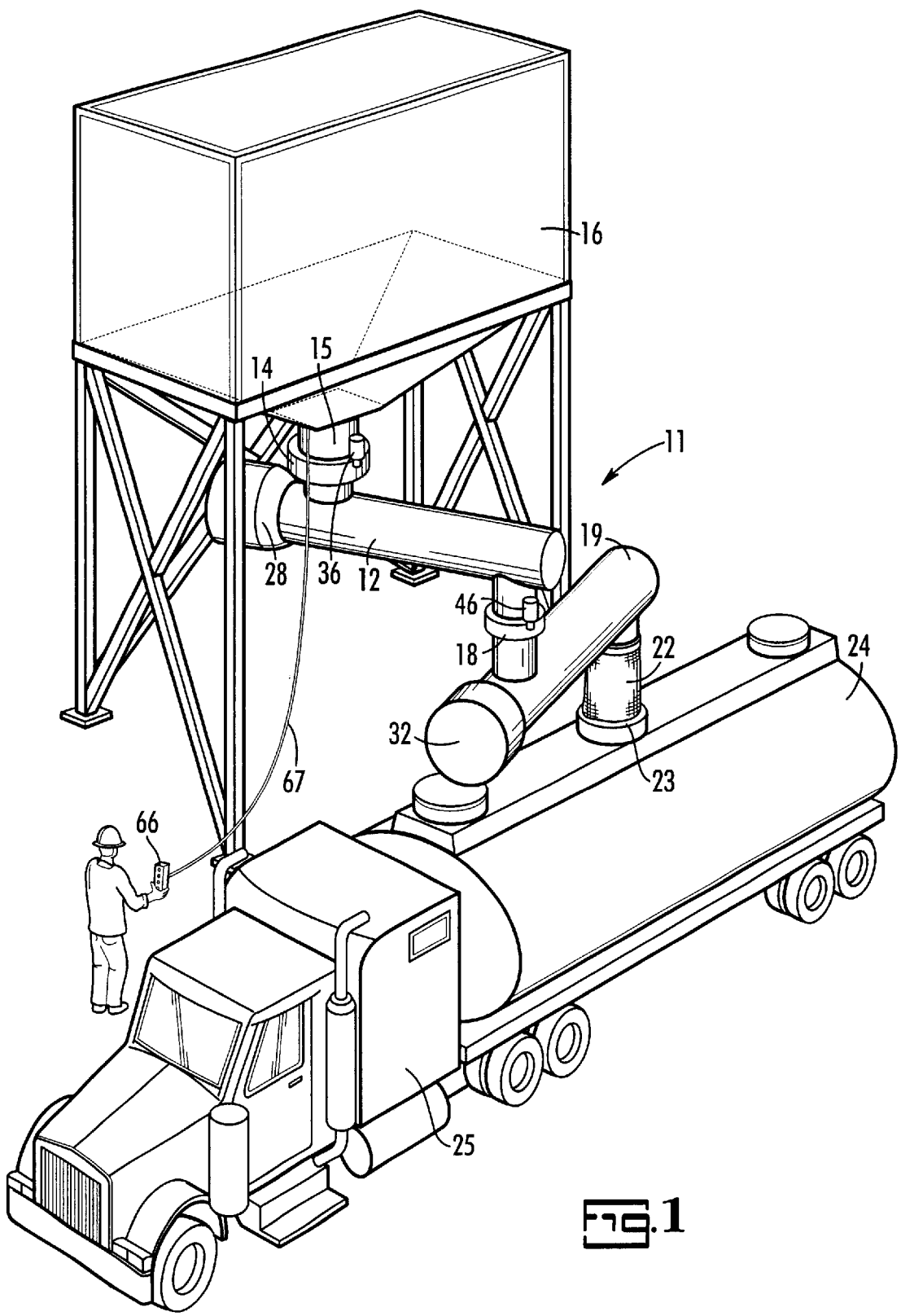
FIG. 1 is a perspective showing the screw conveyor arm being controlled by a single person to transfer dry bulk material from a stationary storage facility to a transport vehicle.
Figure 2:
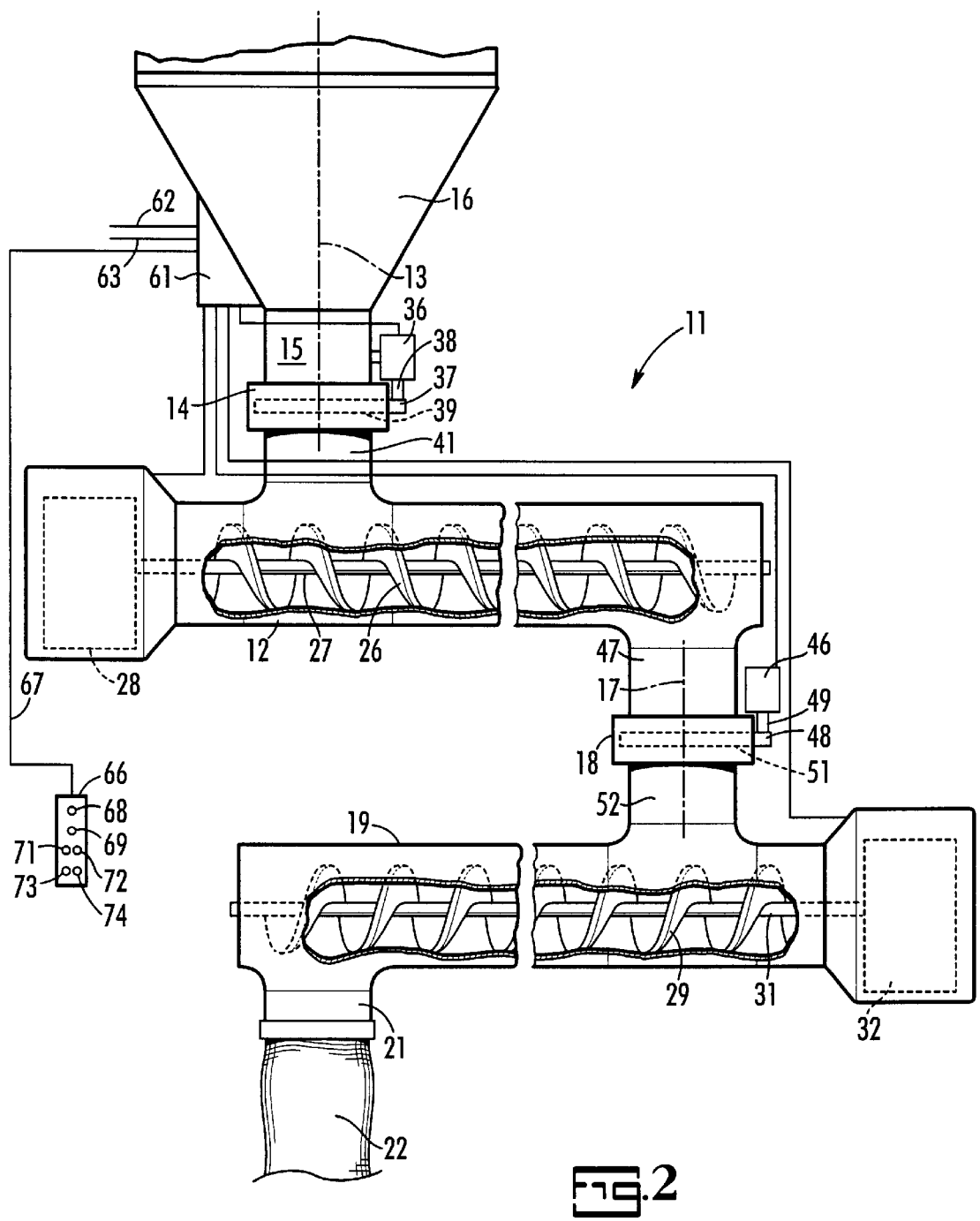
FIG. 2 is a side view of the storage facility and the screw conveyor arm with parts broken away for illustration purposes.

Referring to FIGS. 1 and 2, a screw conveyor arm 11 has a first or upper screw conveyor 12 disposed horizontally with its bulk material receiving end pivotally connected on a vertical pivot axis 13 by a pivot structure 14 to a discharge structure or outlet tube 15 on the bottom of a stationary bulk material storage facility 16.

The discharge end of the upper screw conveyor 12 is pivotally connected on a vertical pivot axis 17 by a pivot structure 18 to a receiving end of a second or lower horizontally disposed screw conveyor 19 which is disposed below the upper screw conveyor 12. The bulk material discharge end of the lower screw conveyor 19 has a downwardly open bulk material discharge chute 21 which includes a flexible discharge tube 22. As shown in FIG. 1, the discharge tube 22 extends into a top opening 23 of a receptacle or tank 24 of a top loading transport vehicle in the form of a semi-trailer tank truck 25.

The upper screw conveyor 12 includes an auger 26 having a shaft 27 connected in driven relation to an electric motor 28 and the lower screw conveyor 19 includes an auger 29 having a shaft 31 connected in driven relation to an electric motor 32. A reversible electric motor 36 is mounted on the outlet tube 15 of the storage facility 16 and has an output or drive shaft 38 with a gear 37 which drivingly meshing with a ring gear 39 nonrotatable secured to an upwardly open feed tube 41 on the receiving end of the upper screw conveyor 12. In a like manner, a reversible electric motor 46 is rigidly secured to a discharge tube 47 at the discharge end of the upper screw conveyor 12. The electric motor 46 has a drive gear 48 on its output shaft 49 which meshes with a ring gear 51 nonrotatably secured to a feed tube 52 on the receiving end of the lower screw conveyor 19.

The electric motors 28, 32, 36, 46 are connected by appropriate leads to an electric control box or module 61 which is supplied with electricity via lines 62, 63. The control box 61 contains relays selectively operated by a hand held controller 66 connected to the control box 61 by a multiple lead cable 67. When the top push button switch 68 is pushed in to a detented position, the auger drive motors 28, 32 will drive the augers 26, 29 to transfer bulk material from the storage facility 16 to the transport vehicle 25. When the push button switch 69 is pushed in to a detented position, the push button switch 68 is released from its detented position and the auger drive motors 28, 32 are disconnected from the source of electrical power.

Push buttons 71, 72, 73, 74, which are provided for controlling the reversible electric motors 36, 46, are each biased to an off position in which the electric motors 36, 46 are not supplied with electric power. When push button 71 is pushed in to a predetermined position and held in that position, the electric motor 36 will drive the ring gear 39 to cause the top screw conveyor 12 to swing in one direction about the vertical axis 13 and when the push button 71 is released, the electric motor 36 will be de-energized and stop its drive of the ring gear 39. The upper screw conveyor 12 can be rotated about the axis 13 in the opposite direction by depressing the push button 72. In a like manner the lower screw conveyor 19 can be pivoted in opposite directions about the vertical axis 17 by operating push buttons 73, 74, respectively.

The articulation of the screw conveyors 12, 19, by use of reversible drive motors 36, 46 controlled by a remote or hand held controller 66, permits a single worker to align the discharge chute 22 with the receiving opening 23 in the transport vehicle 25. The receiving vehicle 25 does not need to be precisely positioned for receiving bulk material. This saves the time it otherwise takes to reposition the vehicle until proper alignment is established. The screw conveyors 12, 19 conveying bulk material from the storage facility 16 to the transport vehicle 25 are controlled by an attendant standing on the ground in a position to observe the alignment of the discharge chute 22 with a selected bulk receiving opening in a tank truck or railway tank car. This bulk unloading apparatus saves time and manpower.

What is claimed is:

1. A screw conveyor arm for conveying dry bulk material from a discharge structure of a storage facility to an opening in a top loading transport vehicle comprising:

a horizontally disposed upper screw conveyor having a bulk material receiving end pivotally connected to said discharge structure on a first vertical pivot axis and having a bulk material discharge end, a horizontally disposed lower screw conveyor having a bulk material receiving end pivotally connected in bulk material receiving relation to said bulk material discharge end of said upper screw conveyor for relative pivotal movement about a second vertical axis, said lower screw conveyor having a bulk material discharge end including a downward extending discharge chute registerable with said opening in said transport vehicle.

an auger in each of said screw conveyors, first and second electric motors connected in driving relation to said auger of said upper screw conveyor and to said auger of said lower screw conveyor, respectively, a third electric motor operable to rotate said upper screw conveyor relative to said discharge structure of said storage facility about said first vertical axis, a fourth electric motor operable to rotate said lower screw conveyor relative to said upper screw conveyor about said second vertical axis, an electric control module including relays connected by leads to said electric motors, a source of electric power connected to said control module, and a controller operatively associated with said control module including manually operable switches controlling operation of said relays.

2. The screw conveyor arm of claim 1 wherein said third electric motor is mounted on discharge structure of said storage facility.

3. The screw conveyor arm of claim 2 wherein said fourth electric motor is mounted on said discharge end of said upper screw conveyor.

4. The screw conveyor arm of claim 2 wherein said upper screw conveyor includes a feed tube on its receiving end to which a first ring gear is nonrotatably secured and said third electric motor includes an output shaft with a drive gear in mesh with said first ring gear.

5. The screw conveyor arm of claim 4 wherein said fourth electric motor is mounted on said discharge end of said upper screw conveyor, said lower screw conveyor includes a feed tube on its receiving end having a ring nonrotatably secured thereto and said fourth electric motor includes a drive shaft having a drive gear in mesh with said second ring gear.

6. The screw conveyor arm of claim 5 wherein said controller is a remote controller.

7. The screw conveyor arm of claim 1 wherein said controller is a remote controller.

8. The screw conveyor arm of claim 7 wherein said remote controller is a hand held controller.

9. The screw conveyor arm of claim 8 wherein said hand held remote controller is connected to said electric control module by a multiple lead cable.

* * * * *